(No Model.)
H. W. TUFTS.
SNAP HOOK.
No. 503,446. Patented Aug. 15, 1893.
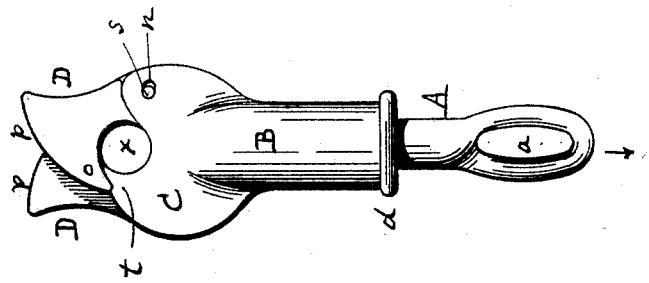
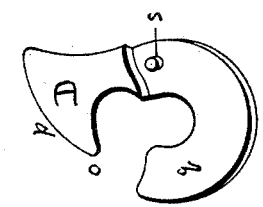
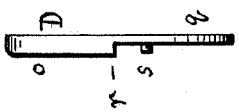
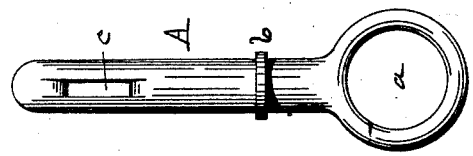
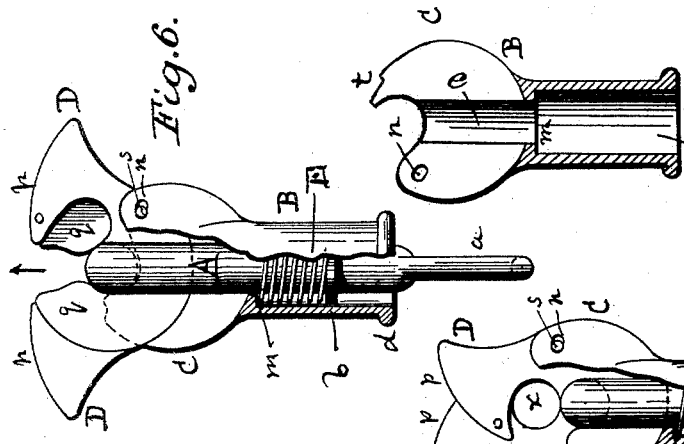
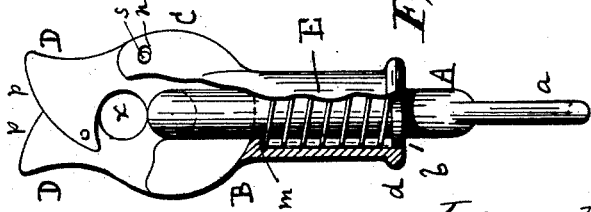
Witnesses
Charles Hannigan
Daniel W. Fink
Inventor
Harry W. Tufts
by Warren R. Perce
Atty.

UNITED STATES PATENT OFFICE.

HARRY W. TUFTS, OF NORTH ATTLEBOROUGH, MASSACHUSETTS.

SNAP-HOOK.

SPECIFICATION forming part of Letters Patent No. 503,446, dated August 15, 1893.

Application filed November 26, 1892. Serial No. 452,981. (No model.)

*To all whom it may concern:*

Be it known that I, HARRY W. TUFTS, of the town of North Attleborough, in the county of Bristol, in the State of Massachusetts, have invented a certain new and useful Improvement in Snap-Hooks; and I declare the following to be a specification thereof, reference being had to the accompanying drawings.

Like letters indicate like parts.

Figure 1 is a side elevation of my invention. Fig. 2 is a side elevation of one of the jaws of my improved snap hook. Fig. 3 is an edge view of the same. Fig. 4 is a side elevation of the stem. Fig. 5 shows, partly in side elevation and partly in diametrical section, the sliding head. Fig. 6 shows my improved snap hook with the jaws open, the jaws, stem and spring being in elevation and the sliding head partly in elevation and partly in diametrical section. Fig. 7 shows the same with the jaws closed.

My invention relates to snap hooks and consists of a stem, having a slot, in combination with a spring actuated sliding head movable on said stem and having an enlargement with sockets in which are pivotally mounted a pair of curved jaws, whose inner curved ends pass through the slot of said stem, as hereinafter particularly specified.

In the drawings, A represents a cylindrical stem which has the ring $a$, the circumferential flange $b$ and the slot $c$.

B is the sliding head having the circumferential flange $d$, the enlargement C, the bore $e$, which is of a diameter to allow its free movement upon the stem A, and the bore $e'$, axially continuous with the bore $e$, but of a larger diameter, sufficient to allow the free movement therein of the flange $b$ of the stem A. The enlargement C of the head has sockets the interior surfaces of which are plane surfaces. At the inner end of the bore $e'$, where it contracts to the diameter of the bore $e$, there is formed thereby an interior circumferential shoulder $m$. The enlargement C has small elongated slots $n$ at its alternate corners and the two corners not so slotted are extended and have the notch or seat $t$. There are two jaws D, the one the reverse of the other, so that the two form a pair to co-operate together. Each jaw D has a hooked portion $o$, with an outer convex edge $p$, and a semi-circular or curved portion $q$, which is of less thickness than the hooked portion $o$, (Figs. 2 and 3,) thus forming an external shoulder $r$. It has also a pivot $s$. A spiral spring E surrounds the stem A. The parts of my device are assembled as follows: The spiral spring E is slipped upon the stem A upon the slotted portion thereof and said stem is inserted through the bores $e$ $e'$ of the sliding head B. The spring E then has two bearings, one against the shoulder $m$ and the other against the flange $b$. The result is that the sliding head is normally kept by the pressure of the spring in the position shown in Figs. 1 and 7. The curved portions $q$ of the jaws D are inserted through the slot $c$ of the stem A and the pivots $s$ are inserted into one side of each jaw, respectively, through the corresponding slots $n$. The jaws D, when closed, have their convex outer edges in the relative positions shown in Figs. 1 and 7, so that when the stem A is held by one hand and the ring of a hitch-rein or chain is pressed by the other hand on the edges of said jaws, said ring is centrally located and the continued pressure of the ring or chain on said convex edges, causes said jaws to open and allow the ring or link to pass in between the jaws. In this movement of the jaws, their inner curved ends, being in engagement with the slot $c$ of the stem A, causes the sliding head B to move along the stem A against the force of the spring. As soon as the ring or link has entered between the jaws D, the retractile power of the spring E forces the sliding head B to its former position and draws the jaws together again. The jaws and the head are so shaped as to leave a central, circular aperture $x$, when the parts are in their normal positions, and in this aperture the ring or link of the hitching strap or chain is supported. The pull or draft of the strap or chain is in the direction indicated by the arrow in Fig. 1 and while it continues, the engagement of the slotted stem A with the curved portions $q$ of the jaws D, keep said jaws securely in the locked positions, shown in Fig. 1.

To detach the ring or link of the hitching strap or chain the sliding head B is seized by the fingers of one hand and the strap or chain is drawn by the other hand in a direction opposite to that indicated by the arrow in Fig.

1. The result is that the head B slides upon the stem A to the position shown in Fig. 6. The pull or draft against the inner or concave edges of the jaws D draws the stem A in the direction indicated by the arrow in Fig. 6 and by the engagement of the curved portions $q$ of the jaws with the slot $c$ of the stem, said jaws are turned upon their pivots in an outward direction, respectively and thus the strap or chain is withdrawn. The slots $n$ are slightly elongated to allow a necessary play of the parts upon each other, for which reason the pivots $s$ are made of a diameter which allows them to slide back and forth in said slots. The curvature of the semi-circular portions $q$ of the jaws affords a certain and desirable engagement of them with the slots $c$ of the stem, and as said jaws lie side by side, they move upon each other and each jaw is supported by the other and is thus strengthened. As the pivots $s$ of the jaws project therefrom in an outward direction, respectively, they do not interfere with this free movement of the plane surfaces of the jaws upon each other. The ring $a$ of the stem A affords means of securing the device to a staple or other connection for support. My improved snap hook is thus a cheap and effective implement and very easily operated. If the sliding head is made of malleable iron, the enlarged part C can be easily spread apart for the insertion of the jaws and pivots and then closed again in position and so will hold the parts properly.

I claim as a novel and useful invention and desire to secure by Letters Patent—

1. The improved snap hook herein described, consisting of the stem A, having the slot $c$, the sliding head B, having a slot and a central bore, in the latter of which the said stem is mounted and movable, the jaws D pivotally mounted upon the sliding head B within the slot thereof, and each having a curved portion $q$, which passes through the slot $c$ of the stem A, and the spring E within the bore of the sliding head B, surrounding the stem A and having one end bearing on said sliding head and the other bearing on said stem, substantially as shown.

2. In a snap hook, the combination with a stem, of a sliding head, mounted and movable upon said stem, and jaws pivotally mounted upon said sliding head and engaged with said stem, substantially as specified.

HARRY W. TUFTS.

Witnesses:
W. S. SMITH,
WARREN R. PERCE.